United States Patent [19]

Ioset

[11] 4,211,775
[45] Jul. 8, 1980

[54] RONNEL COMPOSITION AND USE TO PROMOTE NUTRITIONAL RESPONSE

[75] Inventor: Robert M. Ioset, Midland, Mich.

[73] Assignee: The Dow Chemical Company, Midland, Mich.

[21] Appl. No.: 4,420

[22] Filed: Jan. 18, 1979

Related U.S. Application Data

[63] Continuation-in-part of Ser. No. 766,283, Feb. 7, 1977, abandoned.

[51] Int. Cl.$^2$ ............................................. A61K 31/66
[52] U.S. Cl. ................................................... 424/225
[58] Field of Search ......................................... 424/225

[56] References Cited

U.S. PATENT DOCUMENTS 2,811,480  10/1957  Norris et al. ........................... 424/225

OTHER PUBLICATIONS

*Journal of Animal Science,* #4, 1975, 743–749.
*Journal of Economic Entomology,* vol. 53, No. 4, 541–546.

*Primary Examiner*—Frederick E. Waddell
*Attorney, Agent, or Firm*—Edward E. Schilling; Ronald G. Brookens

[57] ABSTRACT

On feeding ronnel, i.e., O,O-dimethyl O-(2,4,5-trichlorophenyl)phosphorothioate, to livestock and poultry selected from cloven hoof ruminant animals, swine and poultry substantially every day for at least about 3 to about 28 days depending on the animal, and more preferably for a longer period through growth and/or fattening feeding cycles or during maintenance periods, in an effective amount at a dosage below the parasiticidal level in the range of about 0.5 to about 2.5 milligrams of ronnel per kilogram (mg/kg) of body weight per day, a nutritional response is obtained exhibited as faster growth of the livestock and poultry; fiber production, such as wool in sheep, is increased; the production of milk in lactating animals is increased; and, moreover, the feed conversion efficiency of the animal is substantially improved. The ronnel is provided for oral ingestion by the animal on a voluntary basis upon incorporating sufficient ronnel into a balanced feed diet or a component thereof to provide about 0.5 to about 2.5 mg of ronnel per kg of body weight per animal per day on average and substantially every day during the period of nutritional response promotion treatment, prepared feeds typically containing from about 3 to about 190 grams of ronnel per ton of feed (dry matter basis) depending on the age and type of animal. For range-fed animals, the ronnel is conveniently incorporated in a mineral, protein or energy type feed additive supplement.

16 Claims, No Drawings

RONNEL COMPOSITION AND USE TO PROMOTE NUTRITIONAL RESPONSE

CROSS REFERENCE TO RELATED APPLICATION

This application is a continuation-in-part of copending application Ser. No. 766,283, filed Feb. 7, 1977 now abandoned.

BACKGROUND OF THE INVENTION

1. Field of the Invention

The invention relates to a method of obtaining a nutritional response reflected in any one or more of more rapid growth, increased milk and fiber production and improved feed conversion efficiency, of livestock and poultry selected from cloven hoof ruminant animals such as cattle and sheep, swine, and poultry such as chickens, by introducing a nutritionally effective growth promoting substance into the daily diet, or ration, of the animals.

The invention more particularly relates to the use of ronnel, bromophos, or iodofenphos or a mixture thereof below the parasiticidal level as a nutritionally effective growth promotant, typically added to the daily diet in feed compositions and feed additive supplement compositions, including growing mash for poultry.

2. Description of the Prior Art

The use of ronnel, i.e., O,O-dimethyl O-(2,4,5-trichlorophenyl)phosphorothioate for the purpose of controlling parasites such as fleas, flies, lice, ticks, screwworms and cattle grubs as well as the helminthic parasites such as lung worms, stomach worms and gastrointestinal worms, attacking warm-blooded domestic animals is taught and claimed in U.S. Pat. No. 2,811,480 issued Oct. 29, 1957. The method of the patent comprehends the administration of the ronnel either topically or orally at a dosage rate in the range of about 50 to 175 milligrams per kilogram of body weight depending upon the phosphate ester selected and the parasite intended to be controlled. It is further taught that the treatment may be carried out in the form of multiple doses over a period of several days in which case a daily dosage of from about 5 to about 25 milligrams per kilogram of body weight may be employed. Furthermore, it is taught in the patent that domestic animals thus protected from the adverse effects of parasites exhibit improved growth characteristics, but it is not taught that there is any nutritional effect. Ronnel has been sold and used for such parasiticidal purposes for some time.

Rather recently, feeding studies were carried out by the United States Department of Agriculture to determine tissue residues of steers fed ronnel and activated carbon. The results of feeding steers 4.5 milligrams ronnel per kilogram body weight daily for about 90 days is reported and described in Journal of Animal Science, Volume 40, No. 4, 1975 by T. S. Rumsey, E. E. Williams and A. D. Evans. Rumsey et al. report, among other things, both a parasiticide effect with respect to control of house and stable flies and also more rapid growth of the steers fed ronnel in the study.

Both the Moorman Mfg. Company and The Dow Chemical Company have prepared and sold a ronnel-containing mineral supplement (food additive) for cattle and sheep both in loose form and in block form. Such mineral supplements have contained from about 5.5 to about 6 percent by weight ronnel and are expected to provide the animals feeding therefrom at least 4 to 4.5 milligrams per kilogram of body weight per day.

The use of bromophos as an insecticide is disclosed in U.S. Pat. No. 3,227,610 and Belgian Pat. No. 625,198 described in CA 64, 8086a and CA 60, 13187a respectively. Bromophos is O,O-dimethyl O-4-bromo-2,5-dichlorophenyl phosphorothioate.

The use of iodofenphos as an insecticide is disclosed in Netherlands Application No. 65.15,066 of May 23, 1966 as described in CA 65, 13762b,a. Iodofenphos is O,O-dimethyl O-2,5-dichloro-4-iodophenyl phosphorothioate.

SUMMARY OF THE INVENTION

Improved nutritional response evidenced by one or more of more rapid weight gain and increased fiber production and/or milk production plus greater feed conversion efficiency is obtained on feeding a substantially endoparasite-free livestock and poultry animal selected from (a) a cloven hoof ruminant animal and a swine animal from about 0.5 to about 2.5 milligrams of ronnel or bromophos or iodofenphos or a mixture thereof, and (b) the poultry class from about 0.2 to about 2.5 milligrams of ronnel or bromophos or iodofenphos or a mixture thereof, per kilogram of body weight per day substantially daily for (a) at least about 28 days in the case of cloven hoof ruminant animals, (b) at least about 7 days in the case of swine, and (c) at least about 3 days in the case of poultry. More preferably ronnel or other phosphate ester administration is continued at least about 56 days and most preferably for longer periods such as about 112 days or more in the case of the ruminants; more preferably at least about 25 days and most preferably at least about 60 days in the case of swine, and, at least about 3 days, more preferably at least about 25 days and most preferably at least about 60 days, in the case of poultry.

The phosphate ester is conveniently incorporated in a feed composition in appropriate amount to achieve the desired daily dosage in the amount of ration or supplement consumed regularly, generally about 3 to about 190 grams of ronnel per ton of balanced ration (dry matter basis), depending on the age and type of animal. The phosphate ester may also be incorporated in a mineral, protein or energy-type feed additive supplement in an appropriate amount to provide the above-recited daily dosage of ronnel or other recited phosphate ester in the amount of supplement the average animal is expected to consume each day on a daily basis.

For commercial use, it is convenient to provide a feed additive premix or concentrate containing the ronnel or other phosphate ester in a proportion such that a predetermined quantity of the premix to be added per ton of balanced ration (dry matter basis), for example, from about 0.5 to about 1000 pounds, contains from about 3 to about 190 grams of the ronnel or other phosphate ester. The feed additive premix or concentrate consists of the ronnel or other phosphate ester and a carrier such as soybean meal or ground corn or other edible feed grade material or innocuous diluent suitable for the livestock or poultry animals at hand.

DETAILED DESCRIPTION OF THE INVENTION

The following glossary defines terms, for the purposes of the specification and the appended claims, in the main, in terminology promulgated by the Association of American Feed Control Officials.

The term "blocks" means agglomerated feed compressed into a solid mass cohesive enough to hold its form and weighing over two pounds, and generally weighing 30–50 pounds.

The terms "pellets" and "cubes" refer to agglomerated feed formed by compacting and forcing through die openings by a mechanical process and cutting the extrudate into appropriate short lengths. Cubes are made from feed forced through a square opening and cut into appropriate lengths. Pellets are generally made from feed forced through round or oval openings.

The term "carrier" refers to an edible material to which ingredients are added to facilitate uniform incorporation of such ingredients into feeds. The active ingredient is absorbed, impregnated or coated into or onto the edible material in such a way as to disperse and physically carry the active ingredient.

The term "commercial feed" means all materials which are distributed for use as feed or for mixing in feed, for animals other than man, except:
(1) Option A—unmixed seed, whole or processed, made directly from the entire seed; Option B—unmixed or unprocessed whole seeds;
(2) Hay, straw, stover, silage, cobs, husks and hulls (a) when unground, and (b) when unmixed with other materials;
(3) Individual chemical compounds when not mixed with other materials.

The term "concentrate" refers to a feed used with another to improve the nutritive balance of the total and intended to be further diluted and mixed to produce a supplement or a complete feed.

The terms "feed" and "feedstuff" each refer to one or more edible materials which are consumed by animals (here other than man) and contribute energy and/or nutrients to the animal's diet.

The term "diet" means a feed ingredient or mixture of ingredients including water, which is consumed by animals.

The phrase "feed additive premix" refers to an article that must be diluted for safe use in feed additive concentrate, a feed additive supplement or a complete feed. It contains, among other things, one or more additives in high concentrate in a suitable feed base such that up to 100 pounds must be diluted to produce 1 ton of complete feed. A feed additive premix contains additives at levels for which safety to the animal has not been demonstrated and/or which may result when fed undiluted in residues in the edible products from food producing animals in excess of the safe levels established.

The phrase "feed additive concentrate" refers to an article intended to be further diluted to produce a complete feed or a feed additive supplement and is throughout most of the range not suitable for offering as a supplement or for offering free choice without dilution. It contains, among other things, one or more additives in amounts in a suitable feed base such that from 100 to 1000 pounds of concentrate must be diluted to produce 1 ton of a complete feed. A "feed additive concentrate" is unsafe if fed free choice or as a supplement because of danger to the health of the animal or because of the production of residues in the edible products from food producing animals in excess of the safe levels established. (While the foregoing is an accepted standard definition, it will immediately be apparent to those skilled in the art that concentrates containing ronnel or other phosphate ester as set forth herein may be fed quite safely provided the carrier is consumed or restrictedly supplied at a rate to provide ronnel or other phosphate ester according to this invention which is so low as to be below the parasiticidal level.)

The phrase "feed additive supplement" refers to an article for the diet of an animal which contains one or more food additives and is intended to be (1) further diluted and mixed to produce a complete feed; or (2) fed undiluted as a supplement to other feeds; or (3) offered free choice with other parts of the rations separately available. A "feed additive supplement" is intended to be safe for the animal and to not produce unsafe residues in the edible products from food producing animals if fed according to directions.

By "free choice" is meant a feeding system by which animals are given unlimited access to the separate components or groups of components constituting the diet.

"Ration" means the amount of the total feed which is provided to one animal over a 24 hour period.

The term "premix" refers to a uniform mixture of one or more micro-ingredients with diluent and/or carrier. Premixes are used to facilitate uniform dispersion of the micro-ingredients in a larger mix.

The phrase "trace minerals" refers to mineral nutrients required by animals in micro amounts (measured in milligrams per pound or smaller units).

The term "vitamins" means organic compounds that function as parts of enzyme systems essential for the transmission of energy and the regulation of metabolisms of the body of an animal.

Increasing the weight gain, wool production, the milk production in lactating animals, and feed conversion efficiency of livestock and poultry selected from the cloven hoof-ruminant animals, cattle and sheep, from swine, and from poultry, is an important objective of this invention. For example, immature sheep, cattle and swine are commonly fed for maximum growth rate in feedlots and poultry such as chickens and turkeys in broiler pens, until they reach a marketable weight. When the desired weight is achieved, the animal is sold for slaughter. There is a normal feed intake for most animals due to both physical and metabolic factors. It is important economically that the animals achieve market weight in as short a time as possible while consuming the least amount of feed necessary to achieve such gain.

It has been unexpectedly found that when non-parasiticidal levels of ronnel or other phosphate ester specified herein are administered to ruminant animals, swine and poultry they gain weight at a faster rate while consuming less feed per pound of gain resulting in better overall economic efficiency. This phenomenon is observed with animals that have been treated briefly or in a single dose with standard preparations such as dl-2,3,5,6-tetrahydro-6-phenylimidazo(2-1-b)thiazole or 2-(4-thiazolyl)-benzimidazole to substantially remove endoparasites so that the subsequent longer term treatment with phosphate ester according to the present invention produces a nutritional response rather than a parasiticide effect.

Ronnel, bromophos, iodofenphos or a mixture of any two or more of such compounds are herein referred to as "ronnel or, other phosphate ester," or, simply, "phosphate ester".

The practical effect of this invention is to bring ruminant animals such as sheep or cattle, swine and poultry promptly to market weight with minimal feed consumption, to obtain improved fiber (wool) production efficiency, and, in the case of lactating animals, greater milk production efficiency, when there is included in the diet, by way of the feed or feed additive supplement in the daily ration of such animals, substantially every day for at least the minimum periods recited above, the active ingredient or growth promotant, ronnel. The ronnel or other phosphate ester is most conveniently dispersed uniformly throughout the normal feed or feed additive supplement of the subject animal in effective but substantially nonparasiticidal dosage levels.

The increased feed conversion efficiency for any productive function, i.e., increased weight gain, increased fiber (wool) production, and increased milk production of ruminant animals, swine and poultry, fed according to the invention is accomplished by feeding to the animal the compound ronnel or other phosphate ester at the dosage rates and for the times indicated herein.

While the benefits of providing ronnel or other phosphate ester in the diet are generally not markedly noticeable in cloven hoofed ruminants during a feeding period shorter than about 28 days, or 7 days in the case of swine, or 3 days in the case of poultry, the improvement in nutritional response continues to be increasingly evident as providing of ronnel or other phosphate ester continues for longer periods such as up to about 56 days and further, up to about 112 days or more in the case of cloven hoof ruminants, up to about 25 days and preferably at least 60 days or more in the case of swine and poultry. Occasional lapses of several days or more without provision of ronnel or other phosphate ester are not harmful to the animal but limit the beneficial effects largely to those days during which ronnel or other phosphate ester is supplied. Providing ronnel or other phosphate ester during at least 75% and preferably at least 90% of the days throughout a feeding period is considered to be "substantially every day" with respect to the feeding of livestock and poultry according to the present method.

The compound can be mixed with conventional animal feed compositions. The feed compositions are then fed to the described livestock or poultry animals according to methods well known to the agricultural art. The use of ronnel or other phosphate ester is particularly advantageous when incorporated into the normal feeds of meat-producing animals, i.e., into growing and/or fattening ruminant feeds. In the case of wool producing or lactating animals, the diet into which ronnel or other phosphate ester is advantageously incorporated according to the invention may be a high production diet or a good maintenance diet as may be selected by the animal husbandryman or poultryman.

The animal feeds most generally used in conjunction with the method of this invention are composed of various grain mixtures and/or roughage feeds such as hay, cottonseed hulls, rice hulls, silage or other high fiber feedstuffs commonly fed to meat, milk and/or wool-producing animals, especially in cattle or sheep feeds. The feeds for swine and poultry will consist primarily of various grain mixtures plus the usual additaments such as bran meal, cottonseed meal, tankage or alfalfa meals suitable for monogastric animals.

As indicated hereinabove, the amount of ronnel or other phosphate ester added to all such feeds will be in the range of about 3 to about 190 grams of ronnel or other phosphate ester per ton of feed (dry matter basis), depending on the age and type of animal. Very young animals that have been weaned or young poultry one or a few days old will have a lower feed consumption. However, as the animal goes through a growth period to a fattening period, sometimes called finishing, the feed consumption gradually increases, but generally falls in proportion to body weight.

Following are tabulations of feed intake for various sized and types of animals with accompanying computed ronnel or other phosphate ester requirements per ton of feed (dry matter basis) needed to provide the daily dosages set forth above. The average daily feed intake figures are from "Clinical And Diagnostic Veterinary Toxicology", 2nd ed., William B. Buck, Gary D. Oswaler and Gary A. Van Gelder, Kendall/Hunt Publishing Company, Dubuque, Iowa. Equimolar amounts of bromophos or iodofenphos or a mixture thereof may be used in partial or complete replacement of ronnel in these mixtures.

| Body Wt. | | % Feed Intake/- | Ronnel in Feed Grams Per Ton Dosage (mg/kg) | |
|---|---|---|---|---|
| lbs | kg | Body Wt. | 0.5 | 2.5 |
| Beef Cattle | | | | |
| 300 | 136 | 2.3 | 19.7 | 98.6 |
| 450 | 204 | 2.5 | 18.2 | 90.7 |
| 650 | 295 | 2.4 | 18.9 | 94.5 |
| 1000 | 454 | 2.1 | 21.6 | 108 |
| Lactating Cattle | | | | |
| 770 | 350 | 1.4 | 35 | 162 |
| 1760 | 800 | 1.2 | 40 | 190 |
| Non-Lactating Dairy Cattle | | | | |
| 770 | 350 | 1.8 | 33 | 126 |
| 1760 | 800 | 1.6 | 28 | 141 |
| Lambs | | | | |
| 59 | 27 | 4.5 | 10 | 50 |
| 99 | 45 | 3.9 | 11.6 | 58 |
| Swine | | | | |
| 10 | 4.5 | 8 | 5.7 | 28.2 |
| 50 | 22.7 | 6.4 | 7.1 | 35 |
| 100 | 45 | 5.3 | 8.6 | 43 |
| 150 | 68 | 4.5 | 10.1 | 50 |
| 200 | 90 | 4 | 11.4 | 56 |
| Chickens | | | | |
| 0.5 | 0.23 | 14 | 3.2 | 16 |
| 1 | .45 | 11.4 | 4 | 20 |
| 1.5 | .69 | 9.7 | 4.7 | 23 |
| 3.5 | 1.59 | 6.7 | 6.7 | 34 |
| 5.5 | 2.50 | 5.0 | 9.1 | 45 |

From the foregoing, it is apparent that cattle on a growing diet will ordinarily be fed a diet, according to the invention, containing about 18 to about 98 grams ronnel per ton on a dry matter basis (DMB), while cattle on a fattening diet will be fed a feed containing from about 20 to about 110 grams ronnel per ton (DMB). Maintenance diets fed lactating dairy cattle should contain from about 35 to about 190 grams ronnel per ton (DMB), depending on the size and feed intake of animal, while non-lactating dairy cattle should receive a feed containing about 33 to about 140 grams ronnel per ton (DMB).

Lambs on dry feed will generally be fed a ration containing about 10 to about 60 grams ronnel per ton (DMB). Grower pigs may be fed a ration containing about 5 to about 40 grams ronnel per ton (DMB) while swine in the fattening stage will generally be supplied a ration containing about 8 to about 56 grams ronnel per ton (DMB). Poultry such as very small day old or older birds up through starter or grower stage will generally be fed a complete ration or mash containing about 3 to about 20 grams ronnel per ton (DMB) while poultry on a fattening diet will feed on a ration containing about 4 to about 45 grams ronnel per ton (DMB).

In any event, in any specific feeding operation, the actual concentration of ronnel or other phosphate ester used in feed according to the invention is that which will provide daily from about 0.5 to about 2.5 mg/kg of body weight in the feed consumed on average by the animals consuming the feed, and as low as about 0.2 mg/kg in the case of poultry.

For commercial use, the ronnel or other phosphate ester is most readily and conveniently used as a feed additive premix or feed additive concentrate formulation in which the chemical is distributed uniformly throughout a standard organic or inorganic animal feed carrier in a concentrated form which is conveniently packaged and shipped to the feed mixer. This premix or concentrate is then in turn mixed uniformly with a normal diet for the animal as desired by the grower or the feed mixer. Examples of carriers for premix compositions are soybean meal, corn oil, ground corn, barley, wheat, mineral mixtures containing, e.g., vermiculite or diatomaceous earth, corn gluten meal, corn distillers solubles, soy flour or other modestly priced edible ingredients. The active ingredient will be in amounts to satisfy the criteria set forth above for balanced feed rations.

In the case of feed additive premix, a preselected unit quantity thereof in the range of about 0.5 to about 100 pounds will contain a preselected quantity of ronnel or other phosphate ester in one of the ranges set forth above, depending on the animals to be fed and will be suited to mix with the final feed or diet at the rate of one unit quantity per ton of feed.

In the case of feed additive concentrate, a preselected unit quantity in the range of about 100 to about 1000 pounds will likewise contain a preselected quantity of ronnel or other phosphate ester in one of the ranges set forth above and will be suited to mix with the final feed or diet at the rate of one unit quantity per ton of feed.

The ronnel or other phosphate ester may also be admixed with a suitable carrier such as an edible feed or feed component in the form of a feed additive supplement as that is defined hereinabove. Such a supplement may contain about 0.1 to about 10 percent by weight (dry matter basis) ronnel or other phosphate ester. If to be fed free choice or as a supplement, the ronnel or other phosphate ester concentration is provided according to the anticipated daily consumption of the supplement to provide a daily dose in one of the ranges specified herein.

Such a feed additive supplement, if to be used as a supplement, may be a mineral, protein or energy supplement in the form of a liquid, compressed or dry granular composition which can be free choice or self fed to animals grazing pasture, range or crop residue land, or, feeding from a ground feed or mash which does not contain a balanced diet and includes no ronnel or other phosphate ester, the concentration of ronnel or other phosphate ester provided being such as to provide a daily dose of ronnel or other phosphate ester, in the range set forth above as the practice of the invention, in the amount of supplement consumed substantially every day per average animal in a given group being fed.

The animal diets may also contain hay, straw, silage, cornstalks, cottonseed hulls, oats, barley and cereal brans, particularly for the ruminants; natural oils such as animal fat, fish oils, safflower oil, peanut oil, and cotton seed oil; antioxidants, minerals, vitamins, antibiotics, anthelmintics; and other appropriate medicaments.

Ronnel or other phosphate ester fed in accordance with the invention is provided to the animal at a dosage rate substantially too low to produce a parasiticidal effect. The mode of operation of the ronnel or other phosphate ester is not clearly understood but is believed to produce a highly beneficial effect upon the digestive processes occurring in the digestive system, such as the rumen of the ruminant animals, as well as upon the life processes of any of these animals.

Examples of typically prepared ruminant animal feeds are as follows:

EXAMPLE 1

| Ingredients | Weight Percent (D.M. Basis) |
| --- | --- |
| Mixed Hay | 40.0 |
| Ground Yellow Corn | 45.0 |
| Soybean Oil Meal | 7.0 |
| Cane Molasses | 7.0 |
| Dicalcium Phosphate | 0.5 |
| Trace Mineral Salt | 0.5 |
| Vitamin A | 300 IU/lb |
| Vitamin D | 150 IU/lb |
| Ronnel | 18 to 89 grams/ton of feed |

Such a feed typically contains 8 to about 15 percent by weight moisture.

EXAMPLE 2

| Ingredients | Weight Percent (D.M. Basis) |
| --- | --- |
| Ground Shelled Corn | 65.85 |
| Mixed Ground Hay | 20.00 |
| Dried Molasses | 6.00 |
| Soybean Meal | 6.00 |
| Ronnel | 18 to 89 grams/ton of feed |
| Trace Mineral Salt | 0.50 |
| Dicalcium Phosphate | 0.40 |
| Ground Limestone | 0.70 |
| Vitamin A (30,000 units/gms) | 66.7 grams/ton |
| Vitamin $D_2$ (16,000,000 units/lb) | 7.1 grams/ton |

Such a feed typically contains about 8 to about 15 percent by weight moisture.

EXAMPLE 3

An example of a suitable feed additive premix is as follows:

Ronnel: 64 grams

Ground Yellow Corn (5-10% moisture): 1 pound

EXAMPLE 4

For use in the field for animals on range, the ronnel or other phosphate ester may be administered by means of salt or molasses blocks. A typical block may be prepared using the following compositions:

| Ingredients | Weight Percent (D.M. Basis) |
| --- | --- |
| Dried Cane Molasses | 35 |
| Ground Soybean Hulls | 29.6 |
| Ronnel | 6 |

| Ingredients | Weight Percent (D.M. Basis) |
|---|---|
| Granulated Salt | 25.9 |
| Trace Minerals and Vitamins | 0.24 |
| Stabilized Animal Fat | 1.3 |
| Moisture | 2.6 |

EXAMPLE 5

If desired, ronnel or other phosphate ester may be administered as a part of a liquid animal feed supplement such as a supplement containing a nonprotein nitrogen source such as urea in admixture with molasses and other feed ingredients. Such a liquid supplement may be prepared using the following conditions:

| Ingredients | Weight Percent (D.M. Basis) |
|---|---|
| Molasses | 80.00 |
| Water | 13.55 |
| Phosphoric Acid, 85% | 2.70 |
| Ammonium Sulfate | 2.00 |
| Trace Minerals | .50 |
| Vitamin A, D & E | .05 |
| Salt | 1.00 |
| Ronnel | .20 |
| | 100.00% |

The following two examples demonstrate the growth promoting and feed conversion efficiency improving characteristics of ronnel in beef cattle when fed at levels too low to produce a parasiticidal effect.

EXAMPLE 6

120 Beef steers, averaging 591 pounds (268 kilograms) were allotted to 4 treatments of 3 replications of 10 animals, treated with a non-phosphate ester to eliminate internal parasites at the outset of the test, and fed a basal diet consisting of:

| Ingredients | Weight Percent (D.M. Basis) |
|---|---|
| Cottonseed Hulls | 15.00 |
| Soybean Meal | 11.00 |
| Ground Yellow Corn | 52.40 |
| Cane Molasses | 5.00 |
| Salt | 0.25 |
| Calcium Carbonate | 0.70 |
| Sodium Tripolyphosphate | 0.20 |
| Magnesium Oxide | 0.25 |
| Vitamin and Trace Minerals | + |
| Alfalfa Pellets | 15.00 |

To this diet, ronnel was added at a rate of 65 grams per ton of feed in accordance with the invention intending to provide 2 milligrams per kilogram of body weight of animal per day, and also additions were made at the rates of 136 grams of ronnel per ton of feed and 262 grams of ronnel per ton of feed by way of comparisons. In addition, some of the diet was utilized without any addition of ronnel or other phosphate ester as a control. For each treatment protocol then, 3 replicates of 10 animals each, i.e., 30 animals, were fed one of the described diets or diet mixes. After a 56 day feeding period, weight gains and feed gain improvements were determined. The initial body weights of the animals, the number of days fed and the results obtained are tabulated as follows:

TABLE

Example 6

| PARAMETER | Mg/Kg Ronnel | | | |
|---|---|---|---|---|
| | $0^a$ | 2 | $4^b$ | $8^b$ |
| No. of Animals | 30 | 30 | 30 | 30 |
| Initial body weight (lbs) | 591 | 591 | 591 | 591 |
| Days fed | 56 | 56 | 56 | 56 |
| Average daily gain (lbs) | 2.06 | 2.43 | 2.23 | 2.16 |
| Gain improvement (%) | 0 | 15 | 10 | 5 |
| Feed/gain | 7.83 | 6.81 | 7.40 | 7.59 |
| Feed/gain improvement (%) | 0 | 15 | 11 | 3 |

$a$ = control
$b$ = comparison treatments

EXAMPLE 7

In each of a series of studies concurrently carried out, 6 pans of 6 beef steers, i.e., 36 steers per treatment, averaging approximately 643 pounds (292 kilograms) per steer were initially treated with a non-phosphate ester to remove internal parasites and then were fed 84 days the following basal diet:

| Ingredient | Weight Percent |
|---|---|
| Corn silage | 50 |
| Shelled Corn | 38 |
| Protein, Vitamin and Mineral Supplement | 8 |
| Ground Milo and Ronnel Premix* | 4 |

*Controls were fed diet without ronnel in "premix"

In one treatment, the basal diet was fed as a control. In three other treatments, ronnel was added to the feed to provide respective levels, according to the invention, of 0.5, 1.0, and 2.0 milligrams ronnel per kilogram of daily feed ration expected to be consumed by the animal, averaged throughout the test period. In an additional comparison test outside the scope of the invention, sufficient ronnel was added to the feed to provide 4.0 milligrams per kilogram of body weight per amount of feed expected to be consumed daily per animal. The animals were weighed initially and at the conclusion of the 84 day test period. The results of the test are tabulated as follows showing the average daily weight gain and the feed conversion efficiencies.

TABLE

Example 7 - 84 Day Period

| | Mg Ronnel/Kg Body Weight | | | | |
|---|---|---|---|---|---|
| | $0^a$ | 0.5 | 1.0 | 2.0 | $4.0^b$ |
| No. of animals | 36 | 36 | 36 | 36 | 36 |
| Initial weight (lbs) | 643.2 | 642.1 | 642.4 | 643.7 | 645.2 |
| Days fed | 84 | 84 | 84 | 84 | 84 |
| Average daily gain (lbs) | 2.64 | 2.72 | 2.86 | 2.92 | 2.70 |
| Feed/gain$^c$ | 8.15 | 8.02 | 7.54 | 7.47 | 7.88 |

$a$ = control
$b$ = comparison treatment
$c$ = weight ratio, lbs/lb

The data in the foregoing Table indicates that the optimum daily response feeding level for ronnel is approximately 2 milligrams per kilogram of body weight per day during the feeding period.

In the first 28 days of the feeding study described above, the younger, smaller animals ate, as is typical, a greater proportion of diet in comparison to their body weights than in the latter part of the experiment thus ingesting slightly greater amounts of ronnel. The results of that 28 day period are tabulated for the level of ronnel 2.2 mg/kg of body weight, averaged for just that period, and for the controls:

TABLE

Example 7 - 28 Day Period

| | Mg Ronnel/Kg Body Weight | |
|---|---|---|
| | 0 | 2.2 |
| No. of Animals | 36 | 36 |
| Initial weight (lbs) | 643.2 | 643.7 |
| Average daily gain (lbs) | 2.74 | 3.02 |
| Feed/gain | 7.76 | 7.09 |

EXAMPLE 8

In each of a series of studies concurrently carried out, 4 pens of 8 beef steers, i.e., 32 steers per treatment, averaging approximately 500 pounds (227 kilograms) per steer were initially treated with a non-phosphate ester to remove internal parasites and then were fed 56 days the following diet:

| Ingredient | Weight Percent |
|---|---|
| Rolled Barley | 50 |
| Belt Pulp | 20 |
| Almond Hulls | 8.8 |
| Alfalfa | 6.7 |
| Molasses | 6.0 |
| Barley Straw | 3.0 |
| Animal Fat | 3.0 |
| Trace Minerals* | 2.44 |
| Urea | .06 |

*0.0057% Ronnel added by way of mixture of trace minerals and urea which served as feed additive premix, but omitted for controls.

The diet, listed above on an as is basis, was fed as a control, and with ronnel added in requisite amount to provide 2.46 mg/kg of body weight per amount of feed expected to be consumed daily throughout the feeding study. The animals were weighed initially and at the conclusion of the 56 day test period. The results of the feeding study are tabulated as follows:

TABLE

Example 8 - 56 Day Period

| | Mg Ronnel/Kg Body Weight | |
|---|---|---|
| | 0 | 2.46 |
| No. of Animals | 32 | 32 |
| Initial Weight (lbs) | 500 | 500 |
| Average daily gain (lbs) | 3.10 | 3.38 |
| Feed/gain | 6.83 | 6.38 |

EXAMPLE 9

In the following two chick feeding experiments, ronnel was added to the following rye grain basal diet which is illustrative of poultry diets for broilers, i.e. rapidly growing birds for meat production.

| Ingredient | Weight Percent |
|---|---|
| Rye Grain | 55.00 |
| Soybean meal | 27.00 |
| Herring Fishmeal | 5.00 |
| Meat and Bone | 5.00 |
| Dried Whey | 1.00 |
| Dehydrated Alfalfa | 1.25 |
| Salt | 0.22 |
| Animal Fat | 4.00 |

-continued

| Ingredient | Weight Percent |
|---|---|
| Dicalcium Phosphate | 0.50 |
| Ground Limestone | 0.67 |
| Vitamin Premix | 0.25 |
| Trace Mineral Premix | 0.05 |
| DL Methionine | 0.06 |

To this diet ronnel was added at 5, 10 and 50 grams per ton of feed (equivalent to 0.22, 0.44 and 2.20 milligrams per kilogram of animal body weight per day) in accordance with the invention intending to provide about 0.5 to 2.5 milligram per kilogram of animal body weight per day.

Experiment A

Three treatments were each fed, respectively, to four replications of 10 each of broiler type, day old chicks for a 10 day feeding period. The results obtained are tabulated as follows:

| | Ronnel Added Per Ton Feed | | |
|---|---|---|---|
| Parameter | 0 | 5 gms | 10 gms |
| No. of Chicks | 40 | 40 | 40 |
| Average daily gain (gms) | 16.55 | 16.51 | 17.01 |
| Feed/gain | 1.309 | 1.335 | 1.276 |

Experiment B

Two treatments were each fed, respectively, to four replications of 10 each of broiler type, day old chicks for an 11 day feeding period. The results obtained are tabulated as follows:

| | Ronnel Added Per Ton Feed | |
|---|---|---|
| Parameter | 0 | 50 gms |
| No. of Chicks | 40 | 40 |
| Average daily gain (gms) | 16.57 | 17.51 |
| Feed/gain | 1.797 | 1.649 |

On repeating the tests of Examples 6, 7, 8 and 9 using bromophos or iodofenphos or a mixture thereof in partial or complete replacement of the ronnel on a mol for mol basis substantially the same fine results are obtained of a significant nutritional response evidenced by excellent daily gain with good feed utilization efficiency.

EXAMPLE 10

The following is an example of a suitable swine finisher diet to which ronnel or other phosphate ester is added according to the invention.

| Swine Finisher Diet | |
|---|---|
| Ingredient | Weight Percent |
| Ground Corn | 84.54 |
| Soybean Meal | 12.91 |
| Defluorinated Rock Phosphate | 1.80 |
| Salt | 0.50 |
| Trace Mineral and Vitamin Premix | 0.25 |

Shoats of 30 to 50 pounds or more will consume about 4 to about 5.5 pounds of ration per day. Sufficient ronnel or other phosphate ester is added to the daily diet being consumed to provide about 0.5 to about 2.5 mg ronnel or other phosphate ester per kg of body weight per day.

While the maximum benefit of the method of the invention is obtained in feeding ronnel or other phosphate ester throughout the feeding cycle, swine benefit noticeably from feeding ronnel or other phosphate ester for a period of as short as about 7 days, particularly during finishing, a minimum period of about 25 days is more preferred, and a period of at least about 60 days is most preferred.

Similarly, poultry, including chickens, turkeys, ducks, geese and other domestic fowl, benefit noticeably from feeding ronnel or other phosphate ester according to the invention for a period as short as about 3 days, particularly during finishing just before marketing. A minimum period of about 10 days is more preferred, at least 25 days is further desired, and at least about 60 days is most preferred.

Daily feed consumption of poultry is about 0.07 to about 0.3 pounds per day.

The O-(2,4,5-trichlorophenyl) O,O-dimethyl phosphorothioate as herein employed may be prepared by reacting two molecular proportions of sodium methylate with one molecular proportion of O-(2,4,5-trichlorophenyl)-phosphorodichloridothioate. In such operations, the alcoholate is added at a temperature of from 30° to 80° C. to the phosphorodichloridothioate reagent dispersed in a solvent such as benzene. Following the reaction, the product is separated in a conventional manner.

Bromophos and iodofenphos are similarly prepared from the appropriate phosphorodichloridothioate.

A further advantage of the present invention is that it may be practiced upon beef cattle, i.e., cattle on a fattening diet, which have received an estrogenic type hormone implant with the expected benefits of the implant and of the present invention being normally independently achieved in an additive or beneficial manner. Among the typical products implanted are Synovex-H, a mixture of testosterone propionate and estradiol benzoate; MGA, melengesterol acetate form of progestin; Synovex S, a mixture of progesterone, i.e., progestin, and, estradiol benzoate; and stilbesterol, the estrogen being selected appropriately for the sex of the animal to be implanted.

In view of the apparent universaiity of the nutritional response obtained with the present combination in monogastric as well as ruminant animals a fair measure of the results and benefits of the combination is obtainable by performing feeding studies upon laboratory rats.

I claim:

1. The method of promoting a nutritional response, evidenced by at least one of increased average daily weight gain and greater feed conversion efficiency, of livestock and poultry selected from cloven hoof ruminant animals, swine and poultry which are substantially free of internal parasites, which comprises: introducing into the diet of an animal of the designated class from about 0.5 to about 2.5 milligrams of ronnel, bromophos, iodofenphos or a mixture of at least any two of such phosphate esters per kilogram of body weight per day substantially daily over a period of (a) at least about 28 days in the case of cloven hoof ruminant animals; (b) at least about 7 days in the case of swine; and at least 3 days in the case of poultry, the dietary addition of phosphate ester being at a nutritionally effective but substantially nonparasiticidal dosage level.

2. The method as in claim 1 in which the phosphate ester employed is ronnel.

3. The method as in claim 1 in which the amount of the phosphate ester employed is about 1 to about 2 milligrams per kilogram of body weight per day.

4. The method of claim 1 wherein the amount of phosphate ester employed is about 2 milligrams per kilogram of body weight per day.

5. The method as in claim 1 wherein the ruminant animal is a bovine animal.

6. The method as in claim 5 wherein the phosphate ester employed is ronnel.

7. The method as in claim 1 wherein the ruminant animal is a sheep.

8. The method as in claim 1 wherein the animal is a member of the swine class.

9. The method as in claim 1 wherein the animal is a member of the poultry class.

10. The method as in claim 9 wherein the animal is a chicken or a turkey.

11. The method as in claim 1 carried out over a period of at least 56 days in the case of a cloven hoof ruminant animal.

12. The method of claim 1 carried out over a period of at least 112 days in the case of a cloven hoof ruminant animal.

13. The method of claim 1 wherein the phosphate ester is incorporated in intimate admixture with the feed of the ruminant animal.

14. The method of claim 1 wherein the phosphate ester is employed as a component of a mineral feed additive supplement which is fed to the said ruminant animal.

15. The method of claim 1 carried out over a period of at least about 25 days in the case of swine or poultry.

16. The method of claim 1 carried out over a period of at least about 60 days in the case of swine or poultry.

* * * * *